US010133990B2

(12) United States Patent
Hance et al.

(10) Patent No.: US 10,133,990 B2
(45) Date of Patent: Nov. 20, 2018

(54) AUTONOMOUS SHUFFLING OF PALLETS OF ITEMS IN A WAREHOUSE

(71) Applicant: X Development LLC, Mountain View, CA (US)

(72) Inventors: Christopher Hance, Mountain View, CA (US); Daniel Shaffer, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/947,011

(22) Filed: Apr. 6, 2018

(65) Prior Publication Data

US 2018/0225597 A1    Aug. 9, 2018

Related U.S. Application Data

(63) Continuation of application No. 15/244,525, filed on Aug. 23, 2016, now Pat. No. 9,984,339.

(51) Int. Cl.
*G06Q 10/04* (2012.01)
*B65G 1/04* (2006.01)
*G06Q 10/08* (2012.01)

(52) U.S. Cl.
CPC ......... *G06Q 10/043* (2013.01); *B65G 1/0492* (2013.01); *G06Q 10/087* (2013.01)

(58) Field of Classification Search
USPC ....................................................... 700/217
See application file for complete search history.

(56) References Cited

U.S. PATENT DOCUMENTS 7,055,741 B2    6/2006  Bong et al.
8,075,238 B2   12/2011  Wirz et al.
(Continued)

FOREIGN PATENT DOCUMENTS

JP     05-286510 A    11/1993
JP     06-171758 A     6/1994
(Continued)

OTHER PUBLICATIONS

International Search Report and Written Opinion dated Sep. 28, 2017 issued in connection with International Application No. PCT/US2017/041481 filed on Jul. 11, 2017.
(Continued)

*Primary Examiner* — Kyle O Logan
(74) *Attorney, Agent, or Firm* — McDonnell Boehnen Hulbert & Berghoff LLP

(57) ABSTRACT

Examples described may enable rearrangement of pallets of items in a warehouse to an optimal layout. An example method includes receiving real-time item information including pallet locations in a warehouse and real-time inventory of items arranged on the pallets; determining a likelihood of demand for future access to the pallets based on a pallet relocation history and item receiving/shipment expectations; based on the real-time item information and the likelihood of demand, determining an optimal controlled-access dense grid layout in which distances of the pallets from a center of the layout are related to the likelihood of demand; receiving real-time robotics information and using the real-time robotics information to determine an amount of time to rearrange the pallets to the optimal layout; and, based on the amount of time to rearrange the pallets being less than a threshold, causing the robotic devices to rearrange the pallets to the optimal layout.

20 Claims, 5 Drawing Sheets

(56) References Cited

U.S. PATENT DOCUMENTS

| | | |
|---|---|---|
| 8,892,241 B2 | 11/2014 | Weiss |
| 8,965,562 B1 | 2/2015 | Wurman et al. |
| 9,111,251 B1 | 8/2015 | Brazeau |
| 9,120,622 B1 | 9/2015 | Elazary et al. |
| 2004/0146380 A1 | 7/2004 | Baker et al. |
| 2008/0071418 A1 | 3/2008 | Antony et al. |
| 2008/0131255 A1 | 6/2008 | Hessler et al. |
| 2015/0073586 A1 | 3/2015 | Weiss |
| 2016/0042314 A1 | 2/2016 | Mountz et al. |
| 2016/0129592 A1 | 5/2016 | Saboo et al. |
| 2016/0253611 A1 | 9/2016 | Nagahara |

FOREIGN PATENT DOCUMENTS

| | | |
|---|---|---|
| JP | 09-110115 A | 4/1997 |
| JP | 2007-008650 A | 1/2007 |
| JP | 2015-079318 A | 4/2015 |
| KR | 10-2006-0055581 A | 5/2006 |
| KR | 10-2009-0059559 A | 6/2009 |
| WO | 2015-125287 A1 | 8/2015 |

OTHER PUBLICATIONS

International Search Report and Written Opinion dated Sep. 28, 2017 issued in connection with International Application No. PCT/US2017/041484, filed on Jul. 11, 2017.

AUTONOMOUS SHUFFLING OF PALLETS OF ITEMS IN A WAREHOUSE

CROSS-REFERENCE TO RELATED APPLICATION

The present disclosure is a continuation of U.S. patent application Ser. No. 15/244,525, filed on Aug. 23, 2016, and entitled "Autonomous Shuffling of Pallets of Items in a Warehouse," the entire contents of which are herein incorporated by reference as if fully set forth in this description.

BACKGROUND

A warehouse may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storages of pallets—namely, flat transport structures that contain stacks of items, such as goods contained in boxes. Additionally, the warehouse may have machines or vehicles for lifting and moving goods or pallets of items, such as cranes and forklifts. Human operators may be employed to operate machines, vehicles, and other equipment. In some cases, one or more of the machines or vehicles may be robotic devices guided by computer control systems.

SUMMARY

Example implementations of the present disclosure may relate to automated shuffling of pallets in a physical environment such as a warehouse. As an example, a system configured to manage robotic devices in the warehouse may receive or otherwise have access to real-time item information relating to the items in the warehouse, such as real-time locations of pallets in the warehouse and real-time inventory of items that are arranged on the pallets. The system may also receive or otherwise have access to real-time robotics information, such as the real-time task progress, scheduled tasks, locations, etc. of the robotic devices in the warehouse. Using pallet relocation history, item receiving/shipping expectations, and the real-time item information, the system may determine how likely it is that the pallets will be in demand to be accessed in the future. The system may then use the likelihood of demand to determine an optimal layout for the pallets in the warehouse, where the locations of the pallets in the layout are related to how likely it is that the pallets will be in future demand. Using the real-time robotics information, the system may determine an amount of time that it would take robotic devices to rearrange the pallets to the optimal layout, and then instruct the robotic devices to rearrange the pallets to the optimal layout if the determined amount of time is less than a threshold.

In one aspect, the present application describes a method. The method may involve receiving, at a warehouse control system (WCS), real-time item information including real-time locations of pallets positioned in a warehouse and real-time inventory of items arranged on the pallets, where the real-time inventory of the items includes a content of each pallet. The method may further involve determining a likelihood of demand for future access to the pallets based on a history of pallet relocation within the warehouse, an expectation of items to be received at the warehouse at a future date, and an expectation of items to be shipped out of the warehouse at a future date. The method may further involve, based on the real-time item information and the likelihood of demand, determining an optimal controlled-access dense grid layout to which to arrange the pallets, where distances of the pallets from a center of the optimal controlled-access dense grid layout are related to the likelihood of demand. The method may further involve receiving, at the WCS, real-time robotics information including (i) real-time locations of a plurality of robotic devices as positioned in the warehouse, (ii) real-time task progress data for the plurality of robotic devices, (iii) a schedule for performance of the tasks, and (iv) time measurements for one or more of the plurality of robotic devices to perform the tasks. The method may still further involve, based on the real-time robotics information, determining an amount of time to rearrange the pallets to the optimal controlled-access dense grid layout. The method may yet still further involve causing one or more of the plurality of robotic devices to rearrange the pallets to the optimal controlled-access dense grid layout based on the amount of time to rearrange the pallets to the optimal controlled-access dense grid layout being less than a threshold amount of time.

In another aspect, the present application describes a system. The system may comprise a plurality of robotic devices in a warehouse, at least one processor, and data storage comprising instructions executable by the at least one processor to cause the system to perform operations. The operations may include receiving real-time item information including real-time locations of pallets positioned in the warehouse and real-time inventory of items arranged on the pallets, where the real-time inventory of the items includes a content of each pallet. The operations may further include determining a likelihood of demand for future access to the pallets based on a history of pallet relocation within the warehouse, an expectation of items to be received at the warehouse at a future date, and an expectation of items to be shipped out of the warehouse at a future date. The operations may further include, based on the real-time item information and the likelihood of demand, determining an optimal controlled-access dense grid layout to which to arrange the pallets, where distances of the pallets from a center of the optimal controlled-access dense grid layout are related to the likelihood of demand. The operations may further include receiving real-time robotics information including (i) real-time locations of the plurality of robotic devices as positioned in the warehouse, (ii) real-time task progress data for the plurality of robotic devices, (iii) a schedule for performance of the tasks, and (iv) time measurements for one or more of the plurality of robotic devices to perform the tasks. The operations may still further include, based on the real-time robotics information, determining an amount of time to rearrange the pallets to the optimal controlled-access dense grid layout. The operations may yet still further include causing one or more of the plurality of robotic devices to rearrange the pallets to the optimal controlled-access dense grid layout based on the amount of time to rearrange the pallets to the optimal controlled-access dense grid layout being less than a threshold amount of time.

In still another aspect, the present application describes a non-transitory computer-readable medium having stored thereon program instructions that when executed by a computing system that includes at least one processor cause the computing system to perform operations. The operations may include receiving real-time item information including real-time locations of pallets positioned in a warehouse and real-time inventory of items arranged on the pallets, where the real-time inventory of the items includes a content of each pallet. The operations may further include determining a likelihood of demand for future access to the pallets based on a history of pallet relocation within the warehouse, an expectation of items to be received at the warehouse at a future date, and an expectation of items to be shipped out of the warehouse at a future date. The operations may further include, based on the real-time item information and the likelihood of demand, determining an optimal controlled-access dense grid layout to which to arrange the pallets, where distances of the pallets from a center of the optimal controlled-access dense grid layout are related to the likelihood of demand. The operations may further include receiving real-time robotics information including (i) real-time locations of a plurality of robotic devices as positioned in the warehouse, (ii) real-time task progress data for the plurality of robotic devices, (iii) a schedule for performance of the tasks, and (iv) time measurements for one or more of the plurality of robotic devices to perform the tasks. The operations may still further include, based on the real-time robotics information, determining an amount of time to rearrange the pallets to the optimal controlled-access dense grid layout. The operations may yet still further include causing one or more of the plurality of robotic devices to rearrange the pallets to the optimal controlled-access dense grid layout based on the amount of time to rearrange the pallets to the optimal controlled-access dense grid layout being less than a threshold amount of time.

In yet another aspect, a system is provided that includes a means for receiving real-time item information including real-time locations of pallets positioned in a warehouse and real-time inventory of items arranged on the pallets, where the real-time inventory of the items includes a content of each pallet. The system may further include a means for determining a likelihood of demand for future access to the pallets based on a history of pallet relocation within the warehouse, an expectation of items to be received at the warehouse at a future date, and an expectation of items to be shipped out of the warehouse at a future date. The system may further include a means for, based on the real-time item information and the likelihood of demand, determining an optimal controlled-access dense grid layout to which to arrange the pallets, where distances of the pallets from a center of the optimal controlled-access dense grid layout are related to the likelihood of demand. The system may further include a means for receiving real-time robotics information including (i) real-time locations of a plurality of robotic devices as positioned in the warehouse, (ii) real-time task progress data for the plurality of robotic devices, (iii) a schedule for performance of the tasks, and (iv) time measurements for one or more of the plurality of robotic devices to perform the tasks. The system may still further include a means for, based on the real-time robotics information, determining an amount of time to rearrange the pallets to the optimal controlled-access dense grid layout. The system may yet still further include a means for causing one or more of the plurality of robotic devices to rearrange the pallets to the optimal controlled-access dense grid layout based on the amount of time to rearrange the pallets to the optimal controlled-access dense grid layout being less than a threshold amount of time.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

Figure 1:
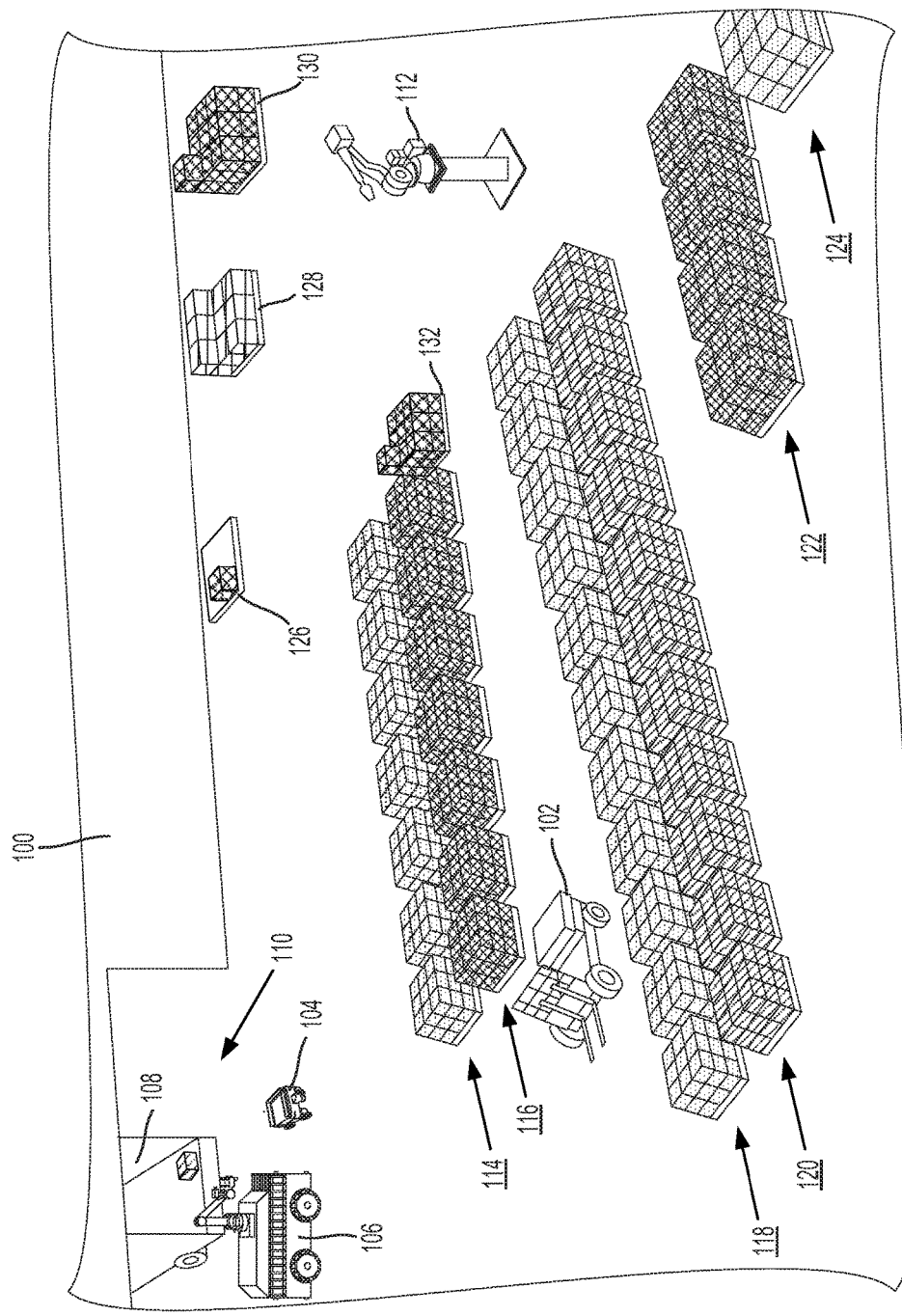
FIG. 1 depicts an example warehouse, in accordance with at least some implementations described herein.

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein. Additionally, in this disclosure, unless otherwise specified and/or unless the particular context clearly dictates otherwise, the terms "a" or "an" means at least one, and the term "the" means the at least one.

As used herein, the term "warehouse" may refer to any physical environment in which items or pallets of items may be manipulated, processed, and/or stored by robotic devices. In some examples, a warehouse may be a single physical building or structures. In other examples, some fixed components may be installed or otherwise positioned within the environment before or during object processing. In additional examples, a warehouse may include multiple separate physical structures, and/or may also include physical spaces that are not covered by a physical structure as well.

An example warehouse may include a homogeneous or heterogeneous group of robotic devices and a control system configured to manage the robotic devices. This group of robotic devices can exist on their own without human operators in an autonomous warehouse environment, or can be co-located with human operators (e.g., human-driven devices such as forklifts) in a collaborative warehouse environment. In the context of a warehouse, such a control system can be referred to as a warehouse control system (WCS). The warehouse may also include a variety of items (e.g., products) arranged on pallets, and the pallets may be arranged in various positions in the warehouse. For instance, pallets may be positioned directly on the floor of the warehouse, stacked on other pallets, placed in pallet racks, and/or stored in shipping containers. When each pallet arrives at the warehouse, the WCS may utilize all available information to determine the most appropriate location to store the pallet.

A group of robotic devices may be used in a warehouse setting for a number of different applications. One possible application includes order fulfillment (e.g., for individual customers), in which cases may be opened and individual items from the cases may be put into packaging within boxes to fulfill individual orders. Another possible application includes distribution (e.g., to stores or other warehouses), in which mixed pallets may be constructed containing groups of different types of items (i.e., types of products) to ship to stores. A further possible application includes cross-docking, which may involve transporting between shipping containers without storing anything (e.g., items may be moved from four 40-foot trailers and loaded into three lighter tractor trailers, and could also be palletized). Numerous other applications are also possible.

As a general matter, the manner in which pallets are arranged in the warehouse may depend on various factors. Such factors may include a history of activities in the warehouse, a history of pallet locations, a history of demand for certain items, trends of items received at the warehouse, trends of items shipped out of the warehouse, received orders for items, forecasted activities in the warehouse, forecasted demand for certain items, forecasted items to be received at the warehouse, forecasted items to be shipped out of the warehouse, business goals (e.g., promotional offers such as same-day delivery), and human and/or robotic resource availability to arrange the pallets, among many other possibilities. The WCS may be configured to use these and other factors with machine learning to facilitate improved management of the warehouse, including the arrangement and rearrangement of pallets in the warehouse.

Provided herein are example methods and systems for autonomously rearranging—or, "shuffling"—pallets in the warehouse. In accordance with an example method, the WCS may receive, determine, or otherwise access real-time item information including real-time locations of pallets of items in the warehouse, a real-time inventory of items in the warehouse, and a real-time content of each pallet (e.g., which items are on which pallets). The WCS may also receive, determine, or otherwise have access to other warehouse information such as pallet relocation history (e.g., information relating to when, where, why, and/or how a pallet was moved from one place to another), an expectation of items to be received at the warehouse, and an expectation of items to be shipped out of the warehouse.

The WCS may use any or all of the information discussed above to determine, for each pallet, a "likelihood of demand"—namely, an indication of how likely it is that the pallet will need to be accessed at some point in the future. For example, if a pallet has not been moved for a long period of time (e.g., days, weeks, months), the WCS may determine that there is a lower likelihood of demand for the pallet. Whereas, if a pallet has more recently been moved one or more times, the WCS may determine that there is a higher likelihood of demand for the pallet. As another example, if the WCS predicts (i.e., forecasts), or knows for certain, that the items on the pallet will not be shipped for a long period of time, the WCS may determine a lower likelihood of demand for the pallet. Whereas, if the WCS predicts, or knows for certain, that items on a pallet will need to be shipped in the near future, the WCS may determine a higher likelihood of demand for the pallet.

The WCS may then consider the likelihood of demand for each pallet to facilitate a determination of an optimal layout for the pallets in the warehouse. In particular, the WCS may determine what may be referred to herein as a "controlled-access dense grid layout" (or just "dense grid layout"), which is a layout that may allow pallets to be stored densely, while still allowing pallets that are predicted to be (or known to be) in higher demand to be easier for robotic devices to access in case the pallets need to be moved for various purposes, thereby controlling how robotic devices access the pallets. The dense grid layout may have various characteristics. At a minimum, for instance, the distance of a given pallet from a center of the dense grid layout may be related to the likelihood of demand for the given pallet.

Further, the WCS may determine what resources would be needed to rearrange the pallets into the optimal dense grid layout, such as the time it would take for robotic devices to rearrange the pallets. If the WCS determines that resources meet certain criteria, the WCS may then instruct the robotic devices to rearrange the pallets. If not, the WCS may not instruct the robotic devices to rearrange the pallets until the WCS determines that the resources meet certain criteria.

Within examples, to facilitate this in practice, the WCS may receive, determine, or otherwise have access to real-time robotics information relating to robot activities in the warehouse. In particular, the real-time robotics information may include real-time locations of the robotic devices, real-time task progress updates for robotic tasks that are in-progress and/or to-be-completed, a task schedule, and respective fixed measurements of how much time the robotic devices will take to perform various tasks, among other possible information. The WCS may then use at least the real-time robotics information to determine how long it would take the robotic devices to rearrange the pallets to the optimal dense grid layout. If the amount of time is less than a threshold amount of time, the WCS may instruct the robotic devices to rearrange the pallets to the optimal dense grid layout.

A dense grid layout may be implemented in two dimensions (e.g., a layout where pallets are placed on the floor or on a bottom level in a storage rack, but where pallets are not stacked or otherwise placed above one another). In other implementations, a dense grid layout may also be implemented in three dimensions, incorporated into warehouse arrangements with stacked pallets. In such implementations, pallets with lower likelihoods of demand may be placed higher (or otherwise more out of the way) in the stack than pallets with higher likelihoods of demand, for instance.

In some implementations, a dense grid layout or different layout may be implemented in pallet storage racks, where pallets with higher likelihoods of demand are placed closer to ground level than pallets with lower likelihoods of demand, so that the pallets with higher likelihoods of demand are easier to access than those closer to the top of the storage rack.

Pallet shuffling may take many forms. In some implementations, the WCS may determine other types of layouts for the pallets, which, like a dense grid layout, can be incorporated into pallet rack and/or stacked pallet arrangements. In some scenarios, the WCS may determine that an optimal layout is a "deep lanes layout", which may be defined by various characteristics. At a minimum, for instance, a deep lanes layout may include groups of pallets arranged in respective lanes such that there is sufficient space between the lanes for robotic devices to travel and access pallets from the lanes. Other layouts are possible as well.

Dynamically and autonomously rearranging pallets in the warehouse may provide various industrial and business advantages. For example, the use of the WCS and robotic devices may greatly reduce or eliminate the need for human labor in rearranging the warehouse. As another example, as demand for items changes over time, the WCS may change the layout of pallets to best reflect the current demand at various points in time, or may proactively change the layout of pallets to best reflect forecasted demand at a future point in time. As yet another example, as available space in the warehouse increases and decreases, the WCS may balance a consideration of available space with other considerations, such as demand, ease of access to items, etc., in order to determine what type of layout would best utilize the available space in the warehouse in light of those considerations. In general, by continuously evaluating the placement of pallets in the warehouse over time and making continuous efforts to rearrange the warehouse, warehouse efficiency may increase, and other examples are possible as well.

It should be noted that in alternate implementations, one or more computing entities associated with the warehouse, such as the WCS and/or other computing systems, may gather, update, process, and/or provide for receipt by the WCS the item information and/or the robotics information less frequently than in real-time.

Reference will now be made in detail to various implementations, examples of which are illustrated in the accompanying drawings. In the following detailed description, numerous specific details are set forth in order to provide a thorough understanding of the present disclosure and the described implementations. However, the present disclosure may be practiced without these specific details. In other instances, well-known methods, procedures, components, and circuits have not been described in detail so as not to unnecessarily obscure aspects of the implementations.

Referring now to the figures, FIG. 1 depicts an example warehouse 100 in accordance with at least some implementations described herein. The warehouse 100 includes various types of robotic devices that may be controlled to collaborate to perform tasks related to the processing of items, pallets, etc. within the warehouse. Certain example types and numbers of different robotic devices are shown here for illustration purposes, but the warehouse may employ more or fewer robotic devices, may omit certain types shown here, and may also include other types of robotic devices not explicitly shown.

One example type of robotic device shown in FIG. 1 is an autonomous fork truck 102, a mobile device with a forklift that may be used to transport pallets of boxes and/or to lift pallets of boxes (e.g., to place the pallets onto a rack for storage). Another example type of robotic device shown is an autonomous guided vehicle (AGV) 104, which may be a relatively small, mobile device with wheels that may function to transport individual items or other objects from one location to another within the warehouse. An additional example type of robotic device is a robotic truck loader/unloader 106, a mobile device with a robotic manipulator as well as other components such as sensors to facilitate loading and/or unloading items and/or pallets onto and/or off of trucks or other vehicles. For instance, robotic truck unloader 106 may be used to load pallets or individual items onto delivery truck 108, which is located at a shipping dock 110 of the warehouse. In some examples, movements of delivery truck 108 (e.g., to deliver packages to another warehouse) may also be coordinated with robotic devices in the warehouse.

Other types of mobile devices than those illustrated here may also be included as well or instead. In some examples, one or more robotic devices may use different modes of transportation besides wheels on the ground. For instance, one or more robotic devices may be airborne (e.g., quadcopters), and may be used for tasks such as moving objects or collecting sensor data of the environment.

Any of the robotic devices described herein may include one or more sensor(s) such as force sensors, proximity sensors, load sensors, position sensors, touch sensors, depth sensors, ultrasonic range sensors, infrared sensors, Global Positioning System (GPS) receivers, sonar, optical sensors, biosensors, Radio Frequency identification (RFID) sensors, Near Field Communication (NFC) sensors, wireless sensors, compasses, smoke sensors, light sensors, audio sensors, microphones, speakers, radar, cameras (e.g., color cameras, grayscale cameras, and/or infrared cameras), depth sensors (e.g., Red Green Blue plus Depth (RGB-D), lasers, a light detection and ranging (LIDAR) device, a structured-light scanner, and/or a time-of-flight camera), a stereo camera, motion sensors (e.g., gyroscope, accelerometer, inertial measurement unit (IMU), and/or foot step or wheel odometry), and/or range sensors (e.g., ultrasonic and/or infrared), among others. The sensor(s) may provide sensor data to a processor(s) to allow for appropriate interaction of a robotic device with the environment. Additionally, a robotic device may also include one or more power source(s) configured to supply power to various components of the robotic device. Any type of power source may be used such as, for example, a gasoline engine or a battery.

In further examples, the warehouse 100 may also include various fixed components. One or more fixed robotic devices may be used to move or otherwise process items. For instance, a pedestal robot 112 may include a robotic arm elevated on a pedestal that is fixed to the ground floor within the warehouse. The pedestal robot 112 may be controlled to distribute items between other robots and/or to stack and unstack pallets of items. For example, the pedestal robot 112 may pick up and move boxes from nearby pallets and distribute the items to individual AGV's 104 for transportation to other locations within the warehouse.

In further examples, the warehouse 100 may include additional fixed components, such as storage racks (not shown) that may be used to store pallets and/or other objects within the warehouse. Such storage racks may be designed and positioned to facilitate interaction with a robotic device, such as autonomous fork truck 102. In addition to or alternative to storage racks, certain ground space in the warehouse 100 may be selected and used for storage of pallets. For instance, some pallets may be positioned within the warehouse environment at chosen locations for certain periods of time to allow the pallets to be picked up, distributed, or otherwise processed by a robotic device. Any fixed component in warehouse 100 may be equipped with one or more sensors, as described herein.

In some examples, any or all of the robotic devices in the warehouse 100 may include one or more sensors, one or more computers, and one or more robotic arms. A sensor may be used to perform various operations, such as scanning areas within the warehouse 100 in order to capture visual data and/or three-dimensional (3D) depth information. Data from a scan may then be integrated into a representation of larger areas in order to provide digital environment reconstruction. In additional examples, the reconstructed environment may then be used for identifying items, pallets, or other objects to pick up, determining pick positions for items or pallets, and/or planning collision-free trajectories along which robotic devices should travel. The warehouse 100 may also include sensors such as cameras or other types of sensors that are not connected to robotic devices. For instance, various sensors may be affixed to various locations in the warehouse, such as the walls, ceilings, etc.

As shown in FIG. 1, the warehouse 100 includes a variety of pallets, each of which may contain one type of item or may contain multiple types of items. In particular, the warehouse 100 includes rows 114, 116, 118, 120, 122, and 124, each of which includes a line of pallets that contain the same type of item. For instance, the pallets of row 114, row 118, and row 124 may each include a first type of item, the pallets of row 116 and row 122 may each include a second type of item, and the pallets of row 120 may each include a third type of item. Alternatively, within any of the rows, adjacent pallets may have different types of items from one another. As a general matter, any two adjacent pallets in the warehouse—including adjacent pallets in the same row or adjacent pallets in two adjacent rows—may or may not have the same type of item.

The pallets in rows 114, 116, 118, 120, 122, and 124 may be considered "full" pallets—namely, pallets that contain the maximum quantity of items allotted per pallet. The maximum quantity of items allotted per pallet may be the same or different for multiple pallets, and may be a quantity defined by the WCS or by a human. Further, the maximum quantity of items allotted per pallet may depend on various factors, such as pallet structure (e.g., the maximum weight that a pallet can support). By comparison, the warehouse 100 may also include various pallets that are less than full, such as pallet 126, pallet 128, pallet 130, and pallet 132. Each of these pallets may include the same type of item or may include different types of items.

The manner in which the pallets are positioned in the warehouse 100 shown in FIG. 1 may be an example of a deep lanes layout. For example, row 114 and row 116 may together form a first lane, row 118 and row 120 may together form a second lane, and row 122 and row 124 may together form a third lane. The first, second, and third lanes may each be separated by a predetermined distance, such as a distance that enables robotic devices (e.g., autonomous fork truck 102) to travel between the lanes and access pallets in the lanes.

Lanes, rows, and pallets can be organized differently from the example shown in FIG. 1. For instance, in other deep lanes layouts, an entire first lane may contain only a first type of item, and an entire second lane may contain only a second, different type of item. Further, the amount of pallets that make up the width and length of each lane can be increased or decreased.

In some examples, the warehouse 100 may additionally include battery exchange/charging stations (not shown). Within examples, some or all of the mobile robotic devices such as autonomous fork truck 102 or AGV 104 may periodically receive charged batteries from a battery exchange station equipped with multiple battery chargers. In particular, the battery exchange station may replace a robotic device's old batteries with recharged batteries, which may prevent robotic devices from having to sit and wait for batteries to charge. The battery exchange station may be equipped with a robotic manipulator such as a robotic arm. The robotic manipulator may remove batteries from an individual mobile robotic device and attach the batteries to available battery chargers. The robotic manipulator may then move charged batteries located at the battery exchange station into the mobile robotic device to replace the removed batteries. For instance, an AGV with a weak battery may be controlled to move over to a battery exchange station where a robotic arm pulls a battery out from the AGV, puts the battery in a charger, and gives the AGV a fresh battery.

Within examples, one or more robotic devices may be brought into the warehouse 100 to create a map of the warehouse 100 space before determining placement of other objects, such as any fixed robotic devices or components discussed above, as well as any pallets. Herein, a "map" refers to information representative of a positioning of elements in a particular area of an environment, and/or representative of a relationship of certain elements to other elements or to the environment. Within example implementations, a map is a digital map, determined by collecting and compiling data representative of relationships between elements in the given environment, and then formatting such data into a virtual form, such as a virtual 2D or 3D image. A map can be a real-time or non-real-time representation of the elements and environment at issue, detailing such elements, the environment, and/or points of interest on such elements and/or in the environment. Additionally or alternatively, at least a portion of a map can be generated through non-robotic means, using traditional or digital surveying techniques, or using other techniques.

Once map information is available, a computing system such as the WCS may determine (e.g., by running simulations) how to layout such components within the space available. In certain cases, a layout may be chosen to minimize the amount of space taken up by the objects. Pallets can be placed at predetermined locations, or can be placed at random, or can be intelligently positioned by the WCS based on consideration of various factors, including factors discussed herein.

To coordinate actions of various devices within the warehouse 100 (e.g., the robotic devices, and possibly other components such as a battery charging station, remotely-controlled shipping dock doors, remotely-controlled ramps, etc.), a global control system, such as a remote, cloud-based server system, may communicate (e.g., through wireless communication) with some or all of the components and/or with separate local control systems of individual components. Any computing system described herein, such as a WCS, may take the form of such a global control system.

Figure 2:
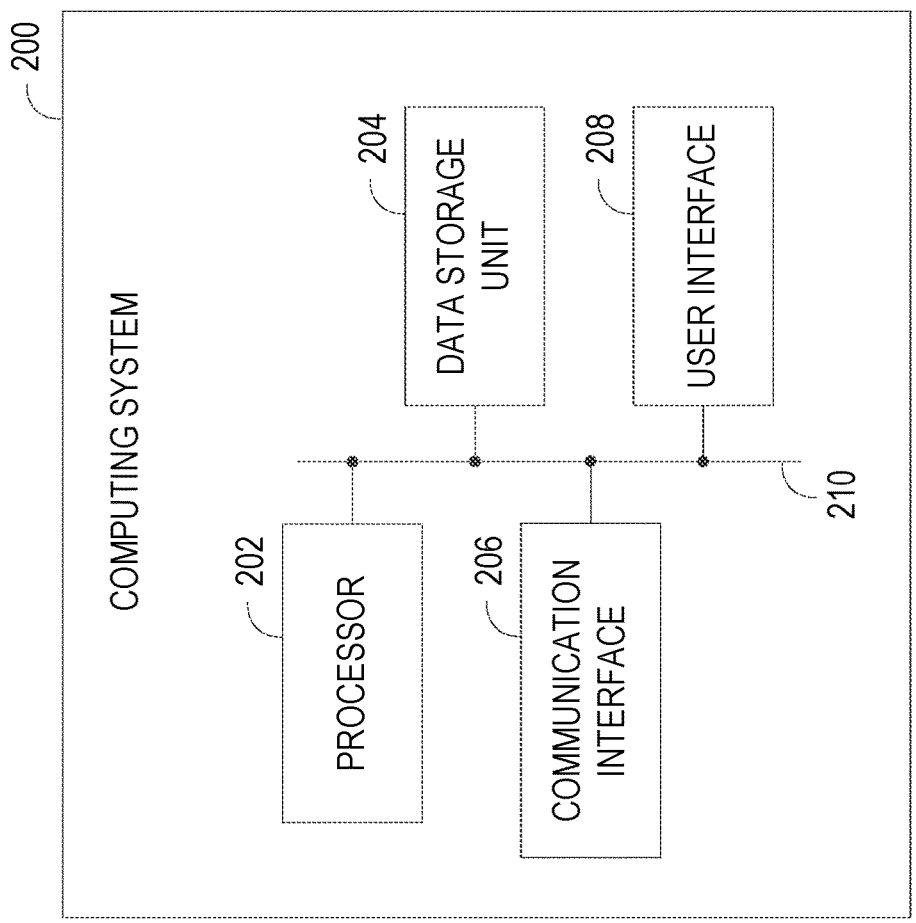
FIG. 2 is a simplified block diagram illustrating components of an example computing system, in accordance with at least some implementations described herein.

FIG. 2 is a simplified block diagram illustrating components of an example computing system 200, in accordance with at least some implementations described herein. For instance, computing system 200 can serve as a WCS and control aspects of a warehouse such as warehouse 100, including dynamically controlling operations of robotics devices or other components in the warehouse, as noted above. As such, computing system 200 can include various components, such as processor 202, data storage unit 204, communication interface 206, and/or user interface 208. The components of computing system 200 can be connected to each other (or to another device, system, or other entity) via connection mechanism 210. In this disclosure, the term "connection mechanism" means a mechanism that facilitates communication between two or more devices, systems, or other entities. For instance, a connection mechanism can be a simple mechanism, such as a cable or system bus, or a relatively complex mechanism, such as a packet-based communication network (e.g., the Internet). In some instances, a connection mechanism can include a non-tangible medium (e.g., where the connection is wireless). Computing system 200 can include more or less components in other example implementations.

Processor 202 may take the form of a general-purpose processor (e.g., a microprocessor) and/or a special-purpose processor (e.g., a digital signal processor (DSP)). In some instances, computing system 200 may include a combination of processors.

Data storage unit 204 may include one or more volatile, non-volatile, removable, and/or non-removable storage components, such as magnetic, optical, or flash storage, and/or can be integrated in whole or in part with processor 202. As such, data storage unit 204 may take the form of a non-transitory computer-readable storage medium, having stored thereon program instructions (e.g., compiled or non-compiled program logic and/or machine code) that, when executed by processor 202, cause computing system 200 to perform one or more acts and/or functions, such as those described in this disclosure. Computing system 200 can be configured to perform one or more acts and/or functions, such as those described in this disclosure. Such program instructions can define and/or be part of a discrete software application. In some instances, computing system 200 can execute program instructions in response to receiving an input, such as from communication interface 206 and/or user interface 208. Data storage unit 204 may also store other types of data, such as those types described in this disclosure.

Communication interface 206 can allow computing system 200 to connect to and/or communicate with another other entity according to one or more protocols. In an example, communication interface 206 can be a wired interface, such as an Ethernet interface or a high-definition serial-digital-interface (HD-SDI). In another example, communication interface 206 can be a wireless interface, such as a cellular or Wi-Fi interface. A connection can be a direct connection or an indirect connection, the latter being a connection that passes through and/or traverses one or more entities, such as such as a router, switcher, or other network device. Likewise, a transmission can be a direct transmission or an indirect transmission.

User interface 208 can facilitate interaction between computing system 200 and a user of computing system 200, if applicable. As such, user interface 208 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, user interface 208 can include hardware and/or software components that facilitate interaction between computing system 200 and the user of the computing device system.

As indicated above, computing system 200 may be configured to dynamically control aspects of a warehouse, such as by coordinating operation of robotic devices operating in the warehouse. As an example, computing system 200 may determine for a given robotic device a schedule that indicates a series of tasks for the robotic device to perform throughout an entire period of time (e.g., 12 hours) and adjust the schedule using subsequent information received from the robotic device (e.g., sensor data, task progress updates), other robotic devices, and/or other systems (e.g., a sensor system) positioned in the warehouse. As another example, computing system 200 may be configured to coordinate operations for multiple robotic devices, including aligning schedules so that two or more robotic devices are located in the same area during a period of time, perhaps in case the computing system has predicted that the two or more robotic devices may be needed to assist with another task in that area during that time. As yet another example, computing system 200 may also arrange schedules so as to not have a threshold high amount of robotic devices performing tasks in the same area during the same period of time, thereby avoiding generation of excess traffic in the warehouse. As yet another example, computing system 200 may alter the schedules of one or more robotic devices to save resources, such as by cancelling a first robotic device's scheduled pickup of a pallet when a second robotic device is closer in distance to the pallet than the first robotic device, and instead instructing the second robotic device to pick up the pallet.

In some implementations, computing system 200 may be integrated with a warehouse management system (WMS). Through this integration, computing system 200 may access various types of information maintained by the WMS, such as warehouse inventory information, demand/order information, expected inbound receiving/delivery information, expected outbound shipping information, and/or other types of information discussed herein. In other implementations, computing system 200 itself may function as a WMS. As such, computing system 200 may gather and maintain this and/or other information.

In some examples, computing system 200 may function as or include a central planning system that assigns tasks to different robotic devices. Herein, a "task" refers to an operation that is assigned to at least one entity for that entity or entities to perform. Within example implementations, such a task is assigned to the at least one entity by a system that monitors, governs, or otherwise manages the at least one entity in order to facilitate a performance of the task by the at least one entity.

The central planning system may employ various scheduling algorithms to determine which devices will complete which tasks at which times. For instance, an auction type system may be used in which individual robots bid on different tasks, and the central planning system may assign tasks to robots to minimize overall costs. In additional examples, the central planning system may optimize across one or more different resources, such as time, space, or energy utilization. In further examples, a planning or scheduling system may also incorporate aspects of the geometry and physics of box picking, packing, or storing.

Planning control may also be distributed across individual system components. For example, computing system 200 may issue instructions according to a global system plan, and individual system components may also operate according to separate local plans. Additionally, different levels of detail may be included within a global plan, with other aspects left for individual robotic devices to plan locally. For instance, mobile robotic devices may be assigned target destinations by a global planner but the full routes to reach those target destinations may be planned or modified locally.

To facilitate planning control, computing system 200 may employ various techniques to monitor the locations of robotic devices in the warehouse 100. These locations may be real-time locations or non-real-time locations. To further facilitate planning control, in some implementations, robotic devices may be configured to continuously or periodically "publish" (e.g., transmit) their locations or the locations of other robotic devices to computing system 200 so that computing system 200 can in turn update the locations of the robotic devices. Computing system 200 and/or the robotic devices can employ other techniques as well to facilitate monitoring locations of the robotic devices.

In additional examples, computing system 200 may employ various techniques to monitor the real-time inventory of the pallets in the warehouse 100 and/or the real-time locations of the pallets. For instance, computing system 200 may instruct one or more mobile robotic devices with vision systems to travel the warehouse and identify the location and the content of each pallet. Such information may be gathered by way of scanning barcodes or other labels on the individual pallets or individual items, as discussed below, or in other manners. Further, while a robotic device is transporting a pallet and repeatedly publishes its own location in real-time during transportation of the pallet, the WCS may interpret the real-time location of the robotic device to be the location of the pallet as well. Still further, after a robotic device drops off the pallet somewhere in the warehouse, the robotic device may notify the WCS of the new location of the pallet. Computing system 200 and/or the robotic devices can employ other techniques as well to facilitate monitoring locations and contents of the pallets.

In additional examples, a central planning system may be used in conjunction with local vision systems on individual robotic devices to coordinate functions of various robotic devices. For instance, a central planning system may be used to get robotic devices at least relatively close to where they need to go (e.g., within millimeters or centimeters). However, it may be difficult for the central planning system to command robots with millimeter precision, unless the robotic devices are bolted to rails or other measured components are used to precisely control robot positions. Local vision systems and planning for individual robotic devices may therefore be used to allow for elasticity between different robotic devices. A general planner may be used to get a robotic device close to a target location, at which point local vision system of the robotic device may take over. In some examples, most robotic functions may be position-controlled to get the robots relatively close to target locations, and then vision systems and handshakes may be used when needed for local control.

Visual handshakes may enable two robotic devices to identify one another by quick response (QR) tag or other characteristics, and to perform collaborative operations within the warehouse 100. In additional examples, items (e.g., packages to be shipped) may be provided with visual tags as well or instead, which may be used by robotic devices to perform operations on the items using local vision systems. In particular, the tags may be used to facilitate manipulation of the items by the robotic devices. For instance, one or more tags on locations on a pallet may be used to inform a forklift where or how to lift up the pallet.

Within additional examples, robotic devices may use their local vision systems to scan and identify individual items or pallets of items during tasks in which robotic devices need to manipulate the items/pallets in some manner. To facilitate this in part, for instance, a given item/pallet may include a machine-readable code (e.g., QR code or barcode) having encoded information about the given item/pallet. As a result of the scanning, the machine-readable code may provide a robotic device's local computing system and/or computing system 200 with the information about the given item/pallet. For instance, for a pallet, such information may include what type of item the pallet carries. Further, such information may include a history of the pallet, such as (i) where in the warehouse the pallet has been, (ii) how many times the pallet has been moved, (iii) when the pallet was moved, (iv) indications of damage to the pallet, if any, and (v) whether the pallet is marked for delivery to another area of the warehouse (e.g., a shipping dock, or for storage in another area), among other types of information. A given item/pallet may additionally or alternatively include a label or other source of such information that the robotic device can scan to identify the item/pallet and obtain such information.

Scanning items/pallets in this manner may have various advantages, such as locating and keeping track of items/pallets as they are moved into, out of, and around the warehouse 100. Further, a potential benefit of such scanning is added transparency, both on the supplier side and the consumer side. On the supplier side, for example, information about current locations of inventory may be used to avoid overstocking and/or to move items/pallets to different locations or warehouses to anticipate demand. On the consumer side, for example, the information about current locations of items may be used to determine when an item/pallet will be delivered with improved accuracy.

Within additional examples, computing system 200 may over time optimize deployment and/or planning strategies for fixed and/or mobile components. For instance, computing system 200 (e.g., a cloud-based server system) may incorporate data and information from individual robotic devices within the warehouse and/or from external sources. Strategies may then be refined over time to enable the robotic devices to use less space, less time, less power, less electricity, or to optimize across other variables. In some examples, optimizations may span across multiple warehouses, possibly including other warehouses with other robotic devices and/or traditional warehouses without such robotic devices. For instance, computing system 200 may incorporate information about delivery vehicles and transit times between facilities into central planning.

Similarly, computing system 200 may over time optimize planning strategies to meet existing demand for items (e.g., current orders for products), meet forecasted demand for items, meet certain business goals, etc.

In some examples, a central planning system may sometimes fail, such as when a robotic device gets stuck or when items get dropped in a location and lost. Local vision systems may also therefore provide robustness by inserting redundancy to handle cases where the central planner fails. For instance, as an automated pallet jack passes and identifies an item, the pallet jack may send information up to a remote, cloud-based server system. Such information may be used to fix errors in central planning, help to localize robotic devices, or to identify lost items.

In further examples, computing system 200 may dynamically update a map of the warehouse 100 and objects undergoing processing by the robotic devices. In some examples, the map may be continuously updated with information about dynamic objects (e.g., moving robotic devices and items/pallets moved by robotic devices). In additional examples, a dynamic map could contain information on both the current arrangement of objects within a warehouse (or across multiple warehouses) as well as information about what is anticipated in the future, such as in the near term (e.g., in upcoming seconds, minutes, hours, or even days) or long term (e.g., in upcoming weeks, months, or even years). For instance, the map could show current locations of moving robotic devices and anticipated locations of the robotic devices in the future, which may be used to coordinate activity between robotic devices. The map could also show current locations of items undergoing processing as well as anticipated future locations of the items (e.g., where an item is now and when the item is anticipated to be shipped out). Further, the map could show anticipated locations of items that have yet to arrive at the warehouse. For instance, computing system 200 may consider a history of orders for items, forecasted orders, a history of pallet relocation, and/or other known or predicted information to cause the map to show where pallets of items should be placed in the warehouse when they arrive.

In line with the discussion above, computing system 200 may also schedule battery exchanges. For instance, individual mobile robotic devices may be configured to monitor their battery charge status. The robotic devices may send information to computing system 200 indicating the status of their batteries. This information may then be used by computing system 200 to schedule battery replacements for individual robotic devices when needed or convenient.

Figure 3:
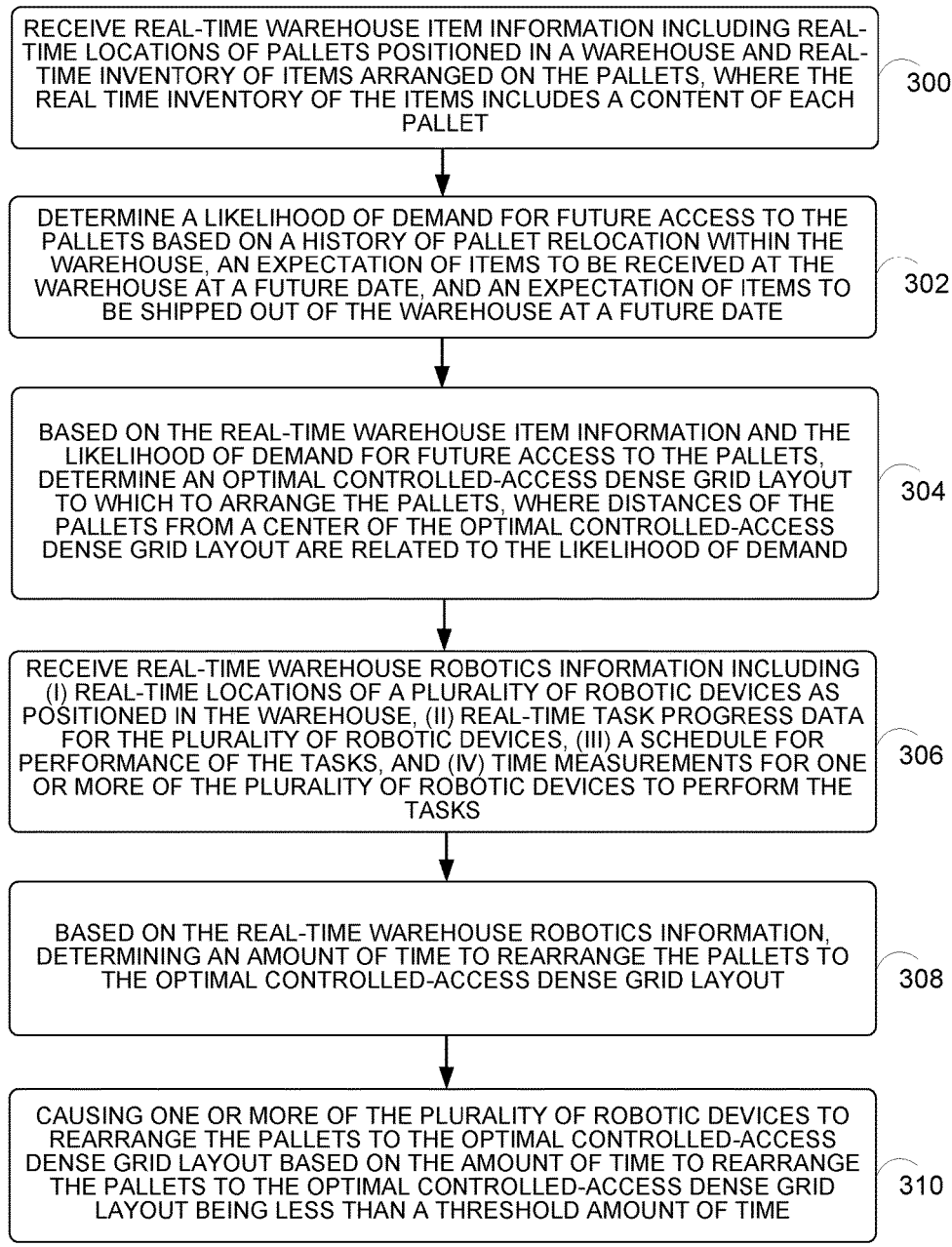
FIG. 3 is a flow chart of an example method, in accordance with at least some implementations described herein.

FIG. 3 is a flow chart of an example method, in accordance with at least some implementations described herein. The method shown in FIG. 3 presents an implementation of a method that, for example, could be used with the systems shown in FIGS. 1 and 2, for example, or may be performed by a combination of any components of those Figures. In addition, such an implementation of a method could be carried out in accordance with the aspects illustrated in FIGS. 4 and 5. The method may include one or more operations, or actions as illustrated by one or more of blocks 300-310. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

Furthermore, for the method and other processes and methods disclosed herein, the flowchart shows operation of one possible implementation. In this regard, each block may represent a module, a segment, or a portion of program code, which includes one or more instructions executable by one or more processors for implementing specific logical operations or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method and other processes and methods disclosed herein, each block in FIG. 3 may represent circuitry that is wired to perform the specific logical operations in the process.

Operations of the method, and operations of other methods and processes disclosed herein, are described as performed by a WCS in some examples, such as computing system 200. However, these operations may be performed in whole or in part by other entities or combinations of entities. For example, these operations may be managed by a central server, which can distribute operations to smaller peer-to-peer networks or servers that may manage portions of the robotic devices.

Within examples, some or all of the operations of this method or other methods may be performed in response to various trigger events. For example, the WCS may determine that a present or future storage capacity requirement is not met, such as an amount of space taken up in the warehouse by the pallets exceeding a threshold amount of space, and the WCS may responsively then take certain actions to rearrange the warehouse to reduce the space taken up by the pallets, such as by rearranging the pallets into a dense grid layout or a deep lanes layout. As another example, the WCS may take certain actions to rearrange the warehouse if an outbound throughput of items does not meet certain throughput requirements.

At block 300, the method involves receiving real-time item information including real-time locations of pallets positioned in a warehouse and real-time inventory of items arranged on the pallets, where the real-time inventory of the items includes a content of each pallet. In examples, some or all of the pallets may be positioned on a floor of the warehouse, rather than positioned in storage racks or stacked on top of other pallets. In other examples, some or all of the pallets may be positioned in storage racks or stacked on top of other pallets.

The real-time inventory of the items may specify the content of the pallets with varying granularity. For example, the real-time inventory may specify, for each pallet, which type (or types, if there are multiple types) of item is arranged on the pallet, and how many of the type(s) of items are on the pallet (e.g., nine items of type A on pallet X, twelve items of type B on pallet Y). Additionally or alternatively, the real-time inventory may specify relationships between items, such as whether two or more items are complementary. Examples of items that are complementary may include DVD players and DVDs, a printer and ink cartridges, or computer hardware and computer software, among other possibilities. Complementary parts may be deemed "complementary" to various degrees. For instance, in some cases car batteries and brake pads may be deemed complementary, but in other cases they may not (but in those other cases, car batteries and car spark plugs may be deemed complementary instead). Other examples are possible as well.

As such, the real-time inventory may specify whether a single pallet includes two or more complementary items (e.g., a single pallet includes both DVDs and DVD players). Additionally or alternatively, the real-time inventory may specify whether two or more pallets include complementary items (e.g., a first pallet includes printers and a second pallet includes ink). An advantage to real-time inventory such as this is that the WCS can use the real-time inventory to position pallets with complementary items within close proximity of each other, as discussed in more detail later in this description.

At block 302, the method involves determining a likelihood of demand for future access to the pallets based on a history of pallet relocation within the warehouse, an expectation of items to be received at the warehouse at a future date, and an expectation of items to be shipped out of the warehouse at a future date. These future dates, as well as any other future dates/times discussed herein, may range from dates closer in time to a current date (e.g., seconds, minutes, hours away) to dates further in time from the current date (e.g., days, weeks, months away).

Within examples, the pallet relocation history may include information relating to when a pallet was moved, such as a time stamp of when the pallet was taken from a first location, a time stamp of when the pallet was subsequently placed at a second location, and/or a period of time during which the pallet was being transported from the first location to the second location. Additionally or alternatively, the pallet relocation history may include information relating to locations from where and/or to where the pallet was moved (e.g., the first and/or second locations noted above). Additionally or alternatively, the pallet relocation history may include information relating to how the pallet was moved, such as information identifying which robotic device(s) were involved in the task of moving the pallet (e.g., what type of robotic device(s)). Additionally or alternatively, the pallet relocation history may include information relating to why the pallet was moved, such as whether the pallet was marked for shipment, whether the pallet recently arrived at the warehouse and was taken to be stored, etc. The pallet relocation history may include other information as well.

Within examples, the WCS may have access to other records/histories, such as inventory history, receiving records, order fulfillment records, shipping records, and the like from various points in time, ranging from minutes to weeks or months in the past, for instance. The WCS may use such records/histories to determine the expectation of items to be received at the warehouse, the expectation of items to be shipped out of the warehouse, and/or other possible information for use in accordance with the method. An "expectation" may be a prediction (with some degree of uncertainty) or may be a certainty. In other words, the WCS may maintain or be provided with existing information such as receiving records, order fulfillment records, shipping records, etc. that may directly indicate to the WCS what items will be received/shipped/etc. in the future, or that the WCS may use with machine learning as a basis for predicting what items will be received/shipped/etc. in the future. For example, if the WCS has access to orders received for an item that is due to be shipped out in a day, the expectation for that item is that the item will be shipped out in a day. By contrast, for example, if the WCS has access to records indicating that many recent orders for an item have come in, or has access to any other information indicating that the item may be in somewhat high demand, the WCS may predict, and thereby expect, that a certain quantity of the item will be arriving at the warehouse and/or shipped out of the warehouse sometime within the upcoming week.

As noted above, a likelihood of demand for a pallet may take the form of data indicating, to a certain degree, how likely it is that a pallet will need to be accessed at some point in the future. In essence, the likelihood of demand serves as a confidence value for the pallet being accessed. The likelihood of demand may be expressed using a percentage (e.g., a 50% chance the pallet will be accessed) or using another type of metric. The WCS may dynamically adjust the likelihood of demand for some or all pallets as the inventory, receiving, shipping, etc. change over time. Further, the likelihood of demand for a pallet may include multiple indications over multiple periods of time. For example, the likelihood of demand for the pallet may be 25% within the immediately-following twenty four hours, but may increase to 75% after the twenty four hour period expires, which may be the case if the WCS expects a shipment of an item on the pallet to occur in two days. Other examples are possible as well.

The determined likelihood of demand may be affected by factors such as business goals and seasonality of items. For example, a website may promote same-day delivery for orders of certain items, and therefore those promoted items may need to be accessed more easily than other items during the course of the promotion, and may thus be placed in a more easily accessible position in a layout of the pallets of the warehouse. As another example, certain items such as snow boots may have a higher likelihood of demand when they are in-season (e.g., fall or winter) and a lower likelihood of demand when they are out of season (e.g., spring or summer). As yet another example, the WCS may determine the likelihood of demand for items based on other order information such as where the order was placed. For instance, if a threshold high quantity of orders come in from Alaska where there may be snow during seasons such as spring or summer, the WCS may determine the likelihood of demand for snow boots to be higher even if the snow boots might otherwise be considered out of season. Other examples are possible as well.

At block 304, the method involves, based on the real-time item information and the likelihood of demand, determining an optimal controlled-access dense grid layout to which to arrange the pallets, where distances of the pallets from a center of the optimal controlled-access dense grid layout are related to the likelihood of demand.

As noted above, a dense grid layout may also be implemented with storage racks and/or stacked pallets such that pallets with lower likelihoods of demand may be placed higher (or otherwise more out of the way) in the storage rack or stack than pallets with higher likelihoods of demand.

As such, pallets that are more likely to be in demand in the near or distant future may be placed near an outside of the dense grid layout (or vertically lower, in a rack or stacked-pallet warehouse environment), thereby making the pallets easier to access. Whereas, pallets that are less likely to be in demand in the near or distant future may be placed farther away from the outside of the dense grid layout (and/or vertically higher, in a rack or stacked-pallet warehouse environment), thereby making the pallets more time/effort consuming to access.

For three dimensional dense grid scenarios, the WCS may determine a respective multi-level controlled-access optimal dense grid layout for each level on a stack of pallets or for each level in a pallet storage rack. The manner in which the WCS determines the locations of pallets within the multi-level dense grid layout based on the pallet likelihood of demand may vary from level to level in a stack/rack. An example of this functionality is discussed in more detail herein with respect to FIGS. 4A and 4B.

In addition to considering the likelihood of demand for future access to the pallets, the WCS may consider other factors to determine other characteristics of the optimal dense grid layout. In some implementations, the WCS may take into account predetermined pallet locations for pallets in the optimal dense grid layout. The WCS may determine such pallet locations itself or may receive such pallet locations from another computing entity or from manual input from a human operator. In an example scenario, twelve pallets containing one type of item may be assigned to twelve designated locations within the optimal dense grid layout, whereas five pallets containing a different type of item may be assigned to five other designated locations within the optimal dense grid layout. Predetermined pallet locations may have various advantages. For example, if a type of item is consistently in demand, it may be desirable to have pallets of that type of item to be placed in locations that are reserved for pallets of that type of item and closer in proximity to the shipping dock of the warehouse than many other pallets. As another example, if the likelihood of demand for certain pallets is inconsistent or otherwise unreliable, it may be desirable to assign those pallets to predetermined locations.

There may also be some scenarios in which the predetermined pallet locations may not be related to the likelihood of demand for the pallets assigned to the predetermined pallet locations. For instance, some pallets may be restricted to specific areas within a warehouse based on characteristics of the pallet itself or the items arranged on it, such as pallet weight/height (which may limit where the pallet can be placed in pallet rack), lighting requirements (e.g., keep certain products in dark areas), dust-free requirements, temperature requirements, vibration requirements (e.g., for fragile objects), etc.

In additional implementations, the WCS may separate pallets having the same type of items from each other in the optimal dense grid layout such that at least one pallet having the type of item is located remotely from other pallets having the same type of item. For example, if eighteen pallets each contain the same item, the WCS may determine the optimal dense grid layout in which nine of those pallets are on one side of the optimal dense grid layout and the other nine of those pallets are on an opposite side of the optimal dense grid layout. As another example, the WCS may stagger or otherwise scatter pallets of the same item in the optimal dense grid layout, either in a predetermined or random manner. Other examples are also possible. It may be advantageous to separate pallets of the same item for various reasons, such as making more room for pallets of other types of items. An advantage to scattering placement of pallets with the same type of item could be avoidance of scenarios in which multiple robotic devices are attempting to travel to one area in the warehouse to retrieve pallets with that type of item and are thus causing the area to become overcrowded. Thus, by scattering the placement of those pallets, collisions, task delays, and/or other negative impacts on warehouse operations can be avoided.

Further, in additional implementations, the WCS may use the real-time inventory to determine that there is a surplus of a type of item in the warehouse—namely, a quantity of the type of item that exceeds a threshold surplus quantity. In response to that determination, the WCS may determine an optimal dense grid layout in which the majority of pallets having the type of item are separated from other pallets having the type of item. For instance, if the type of item has a likelihood of demand that is above a predetermined threshold the majority of pallets having the type of item may be assigned to locations proximal to the outside of the optimal dense grid layout (e.g., on the outside border, or within but near the border), whereas the rest of the pallets with the type of item may be assigned to locations closer to the center of the optimal dense grid layout. Alternatively, if the type of item has a likelihood of demand that is lower than a predetermined threshold, the majority of the pallets having the type of item may be assigned to locations closer to the center of the optimal dense grid layout, whereas the rest of the pallets with the type of item may be assigned to locations proximal to the outside of the optimal dense grid layout. In this manner, excess items can be placed deeper in the dense grid layout when there are enough of those items at locations that are easier to access. The WCS may employ techniques similar to those described above when the WCS determines that there is a surplus of pallets having the type of item, rather than a surplus of the type of item.

Still further, in additional implementations, the WCS may use the real-time inventory or other information that indicates what items are complementary to identify at least one set of two or more complementary items. The WCS may then determine an optimal dense grid layout in which the identified sets of complementary items are located proximate to one another, such as adjacent to one another or within a distance of one or two pallets. For instance, the WCS may identify two sets of complementary items: (i) DVDs and DVD players and (ii) car batteries and car brake pads. The WCS may then determine that the optimal dense grid layout should include one or more pallets of the complementary items to be proximate to each other. For example, two pallets of DVDs may be placed adjacent to one pallet of DVD players in the dense grid layout, and two pallets of car batteries may be placed adjacent to two pallets of car brake pads elsewhere in the dense grid layout. In some cases, the WCS may designate specific pallet locations in the optimal dense grid layout for the pallets of complementary items based on one or more of the considerations discussed above or based on other considerations not discussed herein. In other cases, the WCS may scatter the sets of complementary items at random.

Within examples, the act of the WCS determining an optimal dense grid layout may involve the WCS determining multiple candidate dense grid layouts and then selecting one based on the WCS comparing various considerations, such as whichever candidate dense grid layout will take the least amount of time to for the robotic devices to rearrange, the availability of robotic devices to perform the rearranging, and/or whether there is an urgent need to rearrange the pallets. For instance, there may be a scenario where a first candidate dense grid layout better fits the needs for current and/or forecasted receiving and shipment of items at the warehouse than a second candidate dense grid layout, but takes a longer amount of time to rearrange than the second candidate dense grid layout. In that scenario, if there is an urgent need to rearrange the pallets, such as an urgent instruction from a human operator requiring rearrangement as soon as possible and/or an allocated floor space for pallets in the warehouse having been filled up or nearly filled up, the WCS may select the second candidate dense grid layout instead of the first candidate dense grid layout to be the optimal dense grid layout. Other example scenarios are possible as well.

Within examples, the WCS may determine the optimal dense grid layout based in part on real-time robotics information, such as the information discussed below. The WCS may engage in a process in which the WCS uses the real-time robotics information and/or other information to determine various hypothetical scenarios for retrieval of pallets in the dense grid layout. For instance, for the location of each pallet in the dense grid layout, the WCS may estimate a quantity of robotic devices that would be needed to retrieve the respective pallet from the pallet's location and/or estimate how long it would take for the estimated quantity of robotic devices to retrieve the respective pallet out of the dense grid layout. Such hypothetical scenarios may be used in various ways. For example, for pallets having a mid-range likelihood of demand (e.g., 50%), the WCS may determine how long it would take robotic devices to access those pallets, and may then determine where in the dense grid layout to include such pallets based on how long it would take robotic devices to access them. For instance, the WCS may place such a pallet closer to the outside of the dense grid layout if the WCS determines that other locations for the pallet would place the pallet at a location at which it would take a threshold high amount of time to retrieve. Other examples are possible as well.

Further, the WCS may perform the process discussed above for each of multiple candidate dense grid layouts as a way to determine which candidate should be selected. If, for a given candidate, the WCS's estimated quantity of robotic devices and/or estimated retrieval time exceeds a predetermined threshold for a quantity of pallets that exceeds a predetermined threshold, the WCS may determine that the pallets should not be rearranged to the candidate dense grid layout. For example, if a given candidate has over twenty pallets that would each take over ten minutes to retrieve, the WCS may determine that the candidate should not be selected. Other examples are possible as well.

Given an optimal dense grid layout, the WCS may next determine what resources are available for performing the rearrangement of pallets to the optimal dense grid layout. In essence, the WCS may determine a cost function that considers what else is going on in the warehouse and can thus identify various information, such as which robotic devices are available to assist in the rearrangement, what time is best to perform the rearrangement, how long the rearrangement might take to perform, what the priority level should be for performing the rearrangement with respect to other scheduled or on-going tasks, etc.

To facilitate this, at block 306, the method involves receiving real-time robotics information including (i) real-time locations of a plurality of robotic devices as positioned in the warehouse, (ii) real-time task progress data for the plurality of robotic devices, (iii) a schedule for performance of the tasks, and (iv) time measurements for one or more of the plurality of robotic devices to perform the tasks. The tasks may include tasks that are in-progress and/or tasks that are scheduled to be completed.

A time measurement for performance of a given task can take various forms. Within examples, a time measurement for a given task may be fixed or known. For instance, unless an unforeseen issue arises (e.g., an obstacle blocks a robotic device's path, or a robotic device is damaged), the WCS will expect that the task will take an amount of time (e.g., the task of bringing a pallet from one end of the warehouse to the other will take five minutes). Within other examples, a time measurement for a given task may be variable to account for changes to the task (e.g., if an unforeseen issue arises, or if a trajectory needs to be adjusted), and thus the WCS or other entity may periodically or continuously update the variable time measurement based on the progress of the task. Other examples are possible as well.

Within examples, the real-time robotics information may also include default trajectories or adjusted trajectories for each robotic devices involved in a task or to-be-involved in a task. In this manner, the WCS may maintain or have access to a virtual map that indicates where in the warehouse the robotic devices trajectories will take them during the tasks.

Within additional examples, the real-time robotics information may also include the type of robotic device (e.g., forklift, multi jointed arm, whether the robotic device is static or mobile), and may further include the types of components that each robotic device has. For instance, the information may identify the type of mechanism the robotic device has for transporting items/pallets, such as a gripper (e.g., magnetic, fingers). Factors such as the robotic device type can identify aspects that may help or hinder the robotic device's usefulness in rearranging the pallets, and may thus either lengthen or shorten the total amount of time taken to rearrange the pallets.

Within additional examples, the real-time robotics information may also include the battery levels of each robotic device, as the remaining battery level of a given robotic device may factor into the WCS's decision of whether to select the given robotic device for the performance of a task and/or the WCS's decision of how the given robotic device will assist in the performance of the task.

Generally, the task progress data may include data interpretable by the WCS as an indication of a current state of robotic devices in the warehouse, including one or more robotic devices involved in a performance of a task, or performance of a phase of a task when a task involves multiple task phases. Within examples, the task progress data may include a time at which a task or task phase was completed, and the robotic device that completed the task or task phase may transmit the task progress data to the WCS at the completion time or within a predetermined time window after the completion time. The task progress data may also indicate where the robotic device is/was when the task or task phase is/was completed, and may also indicate where other robotic devices and objects (e.g., other robotic devices, items, pallets, etc. that were involved in a performance of the task or task phase) are located in the warehouse and/or indicate a predicted future location representative of where the other robotic devices, items, pallets, etc. are travelling towards in the warehouse. Further, the task progress data may indicate a current configuration of a given robotic device, such as a set of joint variables of the given robotic device, a configuration of one or more robotic appendages of the given robotic device, and a heading of the given robotic device. Still further, the task progress data may indicate a current status of one or more robotic devices, such as a battery power level of a given robotic device or other diagnostic information, and/or information indicating a robotic appendage of the given robotic device that is not functioning correctly. It should be understood that information which may be indicated by the task progress data, including the information described above, may alternatively be transmitted to the WCS at another time separate from the transmission of the task progress data.

Within examples, to facilitate performance of tasks throughout the warehouse including a task of rearranging the pallets to the optimal dense grid layout (or other layout), the WCS may periodically determine a prioritization of scheduled tasks and/or a prioritization of ongoing tasks. For instance, the WCS may assign to each task a priority level based on various considerations such as those discussed above (e.g., business goals, received orders). Such priority levels can be adjusted based on changing conditions. For example, the WCS may cancel the rearrangement in the middle of the rearrangement (or de-prioritize the rearrangement if the task was scheduled but has not yet occurred) if the WCS determines that resources are needed for performing a different, more important/urgent task. Other examples are possible as well.

At block 308, the method involves, based on the real-time robotics information, determining an amount of time to rearrange the pallets to the optimal controlled-access dense grid layout.

At block 310, the method involves causing one or more of the plurality of robotic devices to rearrange the pallets to the optimal controlled-access dense grid layout based on the amount of time to rearrange the pallets to the optimal controlled-access dense grid layout being less than a threshold amount of time.

In some implementations, before determining how long the task of rearranging the pallets to the optimal dense grid layout will take, the WCS may use the real-time robotics information to review ongoing and scheduled tasks in the warehouse and determine robotic device availability for the task of rearranging the pallets based on that review, thus determining which robotic devices can fit at least a portion of the task of rearranging into their schedule. As an example, in line with the discussion above, once a robotic device completes a task, it may notify the WCS that it has completed the task, and may then engage in another scheduled task for which it will travel along a trajectory to another side of the warehouse. The WCS may determine that there is sufficient time in order for the robotic device to assist with the rearrangement of one or more pallets along its way to the other side of the warehouse, such as one or more pallets proximate to the trajectory. Other examples are possible as well.

The determined amount of time to rearrange the pallets may be exact (provided that the WCS has access to more precise robotic device task progress, location, and availability, for instance) or may be an estimate. If other activities are ongoing in the warehouse that could possibly impact the time taken to rearrange the pallets to the dense grid layout, the WCS's may not be able to determine an exact time. However, if many robotic devices are not currently engaged in tasks or will not be engaged in tasks over a period of time (e.g., overnight), the WCS may be able to determine an exact time.

Within examples, the WCS may determine, for each pallet, an amount of time it will take one or more robotic devices of the robotic devices available for the rearranging to move the pallet to its determined location within the optimal dense grid layout. As such, the total amount of time to rearrange the pallets to the optimal dense grid layout may be a summation of all the amounts of time for each pallet.

In some implementations, the WCS may consider the real-time robotics information and/or other scheduled warehouse activities to determine a time interval during which to optimize a layout of the pallets in the warehouse, and may thus instruct the robotic devices to optimize the layout of the pallets to the optimal dense grid layout or other type of layout during the time interval. For example, the WCS may determine that it will take the robotic devices two hours to rearrange the pallets to the optimal dense grid layout and may identify a two hour window in the following twenty four hours during which to rearrange the pallets.

In similar implementations, the WCS may consider the real-time robotics information and/or other scheduled warehouse activities to allocate an interval of time for a recurring rearrangement of the pallets to a new layout, such as a new optimal dense grid layout or another type of layout. At least some of the operations discussed herein may then be performed on a periodic basis at the allocated time interval. For instance, if less warehouse activities occur overnight during a seven-hour period of time, the WCS may determine that the warehouse should be arranged to a new optimal layout every night during that seven hour period, every other night during that period, or every Sunday during that period.

Figure 4A:
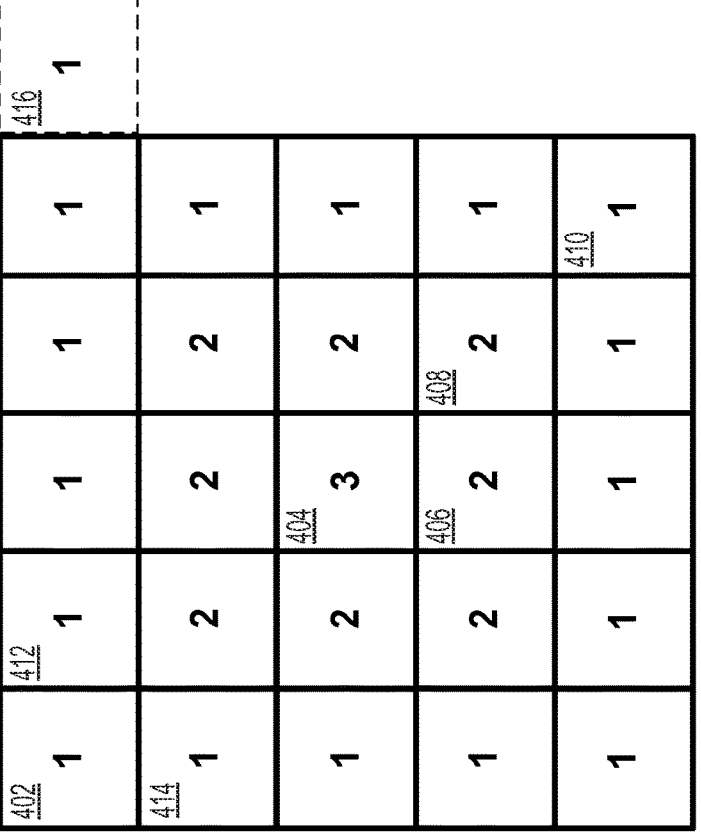
FIGS. 4A and 4B illustrate example layouts of pallets in a warehouse, in accordance with at least some implementations described herein.

FIG. 4A illustrates an example layout of pallets in a warehouse, in accordance with at least some implementations described herein. In particular, optimal dense grid layout 400 is a layout of the locations for twenty-five pallets (a 5×5 grid), where each square in the grid represents a location for a single pallet, such as locations 402, 404, 406, 408, 410, 412, and 414. In other examples, the scale could be increased to accommodate more pallets. For instance, each square could represent a location for more than one pallet (e.g., twenty-five pallets per square).

As shown, the outer sixteen locations (e.g., location 402) are depicted with a priority level of 1, indicating locations designated for pallets with a higher likelihood of demand. Further, the center location in the grid (location 404) is depicted with a priority level of 3, indicating a location designated for a pallet with the lowest likelihood of demand compared to other pallets. Still further, the eight locations in the grid (e.g., locations 406 and 408) between the center and the outer sixteen locations are depicted with a priority level of 2, indicating a location designated for pallets with a likelihood of demand between the outer sixteen pallets and the center pallet.

In some cases, the priority levels may not fully correspond to likelihood of demand. For instance, a pallet at location 402 may have the same likelihood of demand as a pallet at location 406, but may be placed at location 402 for other reasons. For example, there may not be enough room on the outer edge of the layout 400, and so a pallet having a higher likelihood of demand may be placed further inside the dense grid. Alternatively, an extra pallet having a high likelihood of demand could be placed in the outside of the layout 400, thereby creating a new outer edge of the layout 400. This example pallet location on a new outer edge of the layout is shown with dotted lines as location 416.

In line with the discussion above, the WCS may designate various locations shown in layout 400 for pallets based on one or more of the considerations discussed above. For example, complementary items may be placed adjacent to one another at locations 406 and 408, or may be staggered slightly at locations 406 and 410, or at locations 408 and 410. As another example, if there is a surplus of a type of item, such as five full pallets of the item, three of those pallets may be placed at locations 402, 412, and 414, and the other two pallets may be placed close to the center of layout 400, such as locations 404 and 406, or locations 406 and 408, away from the majority of pallets having the type of item. As yet another example, two pallets having the same type of item may be separated such that one pallet is placed at location 402 and the other pallet is placed at location 410. Many other examples are possible as well.

Figure 4B:
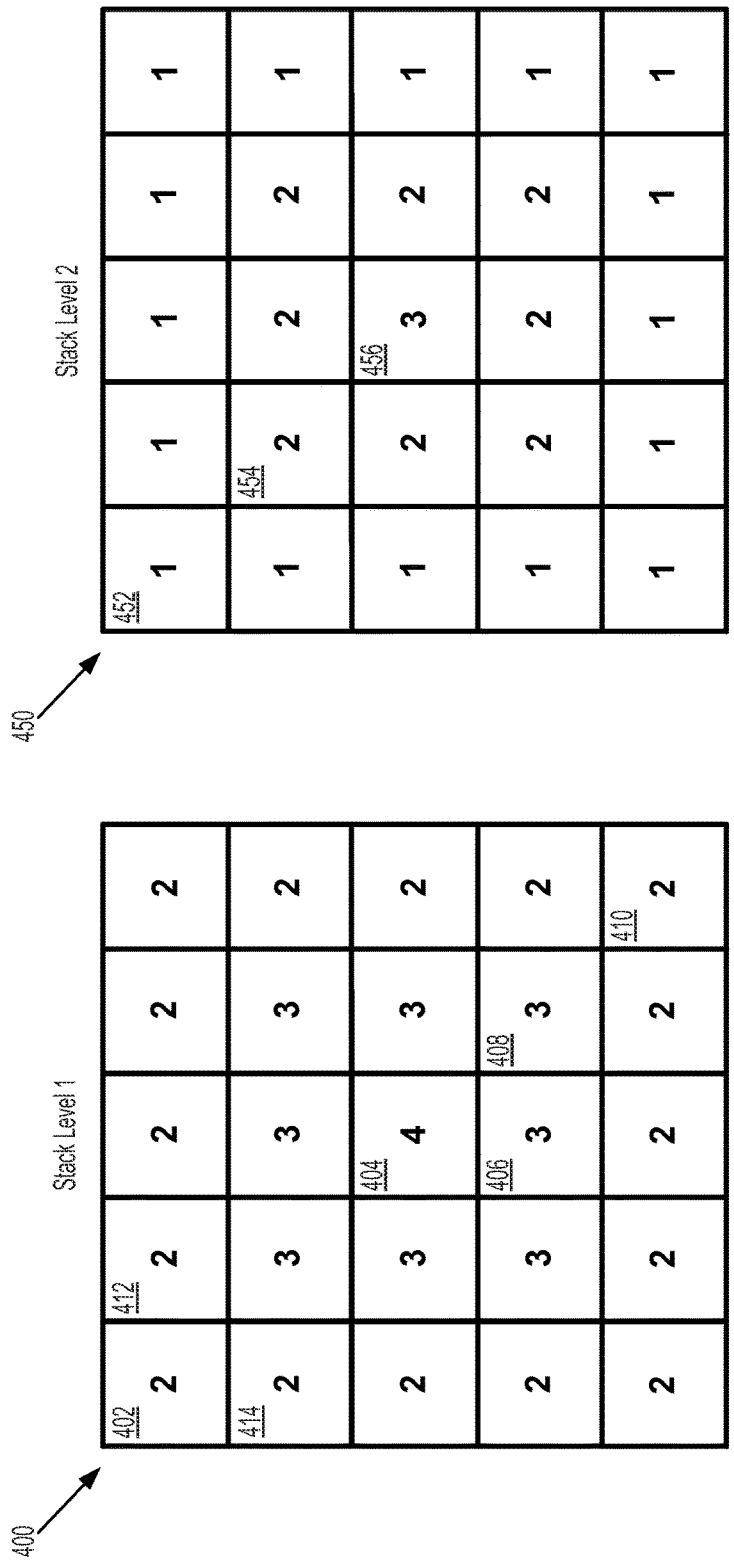

FIG. 4B illustrates another example layout of pallets in a warehouse, in accordance with at least some implementations described herein. In particular, FIG. 4B illustrates a scenario in which the pallets of layout 400 make up a first, lower level in a stack of pallets and layout 450 is a second, higher level in a stack of pallets, stacked on top of the pallets in the first level. Layout 400 and layout 450 together form a single, multi-dimensional dense grid layout.

In a scenario such as this where multiple pallets are stacked, the priority levels of pallets in Level 1 may be changed based on the existence of other levels. For instance, as discussed above, it may be desirable to place higher-demand pallets higher in a stack (or storage rack) and place lower-demand pallets lower in the stack (or storage rack). Accordingly, the priority levels of the pallets in layout 400 are de-prioritized by a level of one, and the pallets in layout 450 have taken on the former priority levels of the pallets in layout 400 shown in FIG. 4A. For instance, as shown, pallet location 452 on Level 2 has a priority level of 1, location 454 has a priority level of 2, and location 456 has a priority level of 3. Whereas, pallet location 402 has a priority level of 1, location 406 has a priority level of 3, and center location 404 has a priority level of 4.

It should be noted that in other scenarios involving storage racks and/or pallet stacks, priority levels may be reversed from what is shown in FIG. 4B, such that lower-demand pallets are placed higher in the stack (or storage rack) (e.g., Level 2) and higher-demand pallets are placed lower in the stack (or storage rack) (e.g., Level 1). It should also be noted that the priority levels may vary with respect to one another in other implementations. For example, all thirty-two pallet locations on the outer edge of the combined layout may each have a priority level of 1, all sixteen pallet locations in the middle area of the combine layout may each have a priority level of 2, and the two stacked center pallet locations may each have a priority level of 3. Other examples are possible as well.

Operations similar to those discussed above may be applied with respect to types of layouts other than a controlled-access dense grid layout. For example, the WCS may determine a deep lanes layout and various aspects of the deep lanes layout (e.g., pallet placement, width/depth of lanes) based on considerations, factors, etc. similar to those discussed above, such as receiving/shipping records, throughput of items, business goals, urgent orders, and the like. As a more particular example, the WCS may determine that pallets having items expected to be shipped out of the warehouse within a threshold period of time from a present date should be placed closer (e.g., as close as possible without obstructing human/robotic operation) to the shipping dock than pallets that are not expected to be shipped out until further in the future.

Depending on these considerations and factors, the WCS may determine that other types of layouts may be simpler or otherwise more desirable than a controlled-access dense grid layout, and may thus instead rearrange some or all of the pallets into a different type of layout as an alternative. Any type of layout discussed herein may be an alternative to a first-in, first-out arrangement of pallets commonly employed in warehouses.

As a general matter, the WCS may facilitate an automated rearrangement of pallets on the floor, in storage racks, and/or stacks into one or more layouts such that higher-demand items are located at the ends of lanes/rows, at the bottom levels of racks, and/or closer to outbound areas (e.g., shipping docks), and such that lower-demand items are located at opposite ends of lanes/rows, at higher levels of racks, and/or further away from outbound areas.

In some scenarios, the WCS may implement, for each of multiple groups of pallets identified by the WCS, a respective layout. For example, the WCS may rearrange a first group of pallets into a dense grid layout and may rearrange a second group of pallets into a deep lanes layout. As another example, the WCS may rearrange the first and second groups of pallets into their own respective dense grid layouts. Other examples are possible as well.

In some implementations, the WCS may switch the arrangement of the pallets in the warehouse (or a smaller group of the pallets) from a dense grid layout to an optimal deep lanes layout. To facilitate this, the WCS may update various considerations and factors discussed above, such as the receiving/shipping expectations and the pallet relocation history, and use those updates to determine an updated likelihood of demand and, in turn, determine an optimal deep lanes layout. In some examples, the WCS may determine multiple candidate deep lanes layouts and select an optimal one. In line with the discussion above, the WCS may then use the real-time robotics information and/or other information to determine an amount of time to rearrange the pallets to the optimal deep lanes layout, and then instruct robotic devices to rearrange the pallets to the optimal deep lanes layout if the amount of time is less than a threshold amount of time.

Within examples of deep lanes layouts, the determination of an optimal deep lanes layout may involve a determination of the respective aisle widths between lanes to enable one-way or two-way travel for smaller and/or larger robotic devices, as certain aisle widths may make it easier or more difficult for robotic devices to retrieve pallets storage in the lanes, depending on the scenario. The respective aisle widths may be determined based on various considerations, such as the size of available robotic devices, the schedules of each available robotic device, and/or other factors.

Within examples of other similar operations between dense grid and deep lanes layouts, the WCS may engage in a process similar to that described above to determine various hypothetical scenarios for retrieval of pallets in the deep lanes layout. For instance, the WCS may estimate, for each of the pallets in the optimal deep lanes layout (or in each candidate deep lanes layout), a quantity of robotic devices that will be needed to retrieve the pallet from a location of the pallet in the optimal deep lanes layout and an amount of time for the estimated quantity of robotic devices to retrieve the pallet from the location in the optimal deep lanes layout.

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are operational entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A method comprising:
    determining, by a warehouse control system (WCS), a likelihood of demand for future access to pallets positioned in a warehouse, wherein determining the likelihood of demand is based on an expectation of items to be received at the warehouse at a future time, and an expectation of items to be shipped out of the warehouse at a future time;
    based on the likelihood of demand, determining a dense grid layout to which to arrange the pallets, wherein distances of the pallets from a center of the dense grid layout are related to the likelihood of demand;
    determining an amount of time for at least one robotic device to rearrange the pallets to the dense grid layout; and
    controlling the at least one robotic device to rearrange the pallets to the dense grid layout based on the amount of time to rearrange the pallets to the dense grid layout being less than a threshold amount of time.

2. The method of claim 1, wherein determining the likelihood of demand is further based on a history of pallet relocation within the warehouse.

3. The method of claim 1, further comprising:
    receiving, at the WCS, real-time item information including real-time locations of the pallets positioned in the warehouse and real-time inventory of items arranged on the pallets,
    wherein the real-time inventory of the items includes a content of each pallet, and
    wherein determining the dense grid layout is further based on the real-time item information.

4. The method of claim 1, further comprising:
    receiving, at the WCS, real-time robotics information relating to locations of the at least one robotic device and tasks for performance by the at least one robotic device,
    wherein determining the amount of time for the at least one robotic device to rearrange the pallets to the dense grid layout is based on the real-time robotics information.

5. The method of claim 4, wherein the real-time robotics information includes task progress data for the tasks, a schedule for performance of the tasks, and expected times for completion of performance of the tasks.

6. The method of claim 4, wherein the real-time robotics information includes remaining battery levels of the at least one robotic device.

7. The method of claim 4, further comprising:
based on the real-time robotics information, estimating, for each of the pallets in the dense grid layout, (i) a quantity of robotic devices that will be needed to retrieve the pallet from a location of the pallet in the dense grid layout and (ii) an amount of time for the estimated quantity of robotic devices to retrieve the pallet from the location in the dense grid layout,
wherein controlling the at least one robotic device to rearrange the pallets to the dense grid layout is further based on the estimated quantity of robotic devices and the estimated amount of time.

8. The method of claim 1, wherein determining the dense grid layout is further based on information identifying sets of two or more complementary items, and
wherein controlling the at least one robotic device to rearrange the pallets to the dense grid layout comprises controlling the at least one robotic device to rearrange the pallets to the dense grid layout such that, in the dense grid layout, the two or more complementary items of each identified set are located proximate to one another.

9. The method of claim 1, further comprising:
determining that a quantity of a type of item in the warehouse exceeds a threshold surplus quantity,
wherein determining the dense grid layout is further based on the quantity of the type of item exceeding the threshold surplus quantity, and
wherein controlling the at least one robotic device to rearrange the pallets to the dense grid layout comprises controlling the at least one robotic device to rearrange the pallets to the dense grid layout such that, in the dense grid layout, a majority of pallets having the type of item are located remotely from other pallets having the type of item and at a location proximal to the center of the dense grid layout.

10. The method of claim 1, further comprising:
determining that an amount of space taken up in the warehouse by the pallets exceeds a threshold amount of space,
wherein at least a portion of the method is performed in response to determining that the amount of space taken up in the warehouse by the pallets exceeds the threshold amount of space.

11. The method of claim 1, further comprising:
based on scheduled warehouse activities, allocating a time interval for recurring rearrangement of the pallets to a new dense grid layout,
wherein at least a portion of the method is periodically performed at the allocated time interval rearrange the pallets.

12. The method of claim 1, wherein controlling the at least one robotic device to rearrange the pallets to the dense grid layout is further based on a comparison of an expected outbound throughput of items and a storage capacity requirement for a future date.

13. The method of claim 1, wherein determining the dense grid layout comprises determining a multi-level dense grid layout, wherein, in the multi-level dense grid layout, pallets having a lower likelihood of demand are placed vertically lower than pallets having a higher likelihood of demand.

14. The method of claim 1, wherein determining the dense grid layout comprises determining a multi-level dense grid layout, wherein, in the multi-level dense grid layout, pallets having a lower likelihood of demand are placed vertically higher than pallets having a higher likelihood of demand.

15. A non-transitory computer-readable medium having stored thereon program instructions that when executed by a computing system that includes at least one processor cause the computing system to perform operations comprising:
determining a likelihood of demand for future access to pallets positioned in a warehouse, wherein determining the likelihood of demand is based on an expectation of items to be received at the warehouse at a future time, and an expectation of items to be shipped out of the warehouse at a future time;
based on the likelihood of demand, determining a dense grid layout to which to arrange the pallets, wherein distances of the pallets from a center of the dense grid layout are related to the likelihood of demand;
determining an amount of time for at least one robotic device to rearrange the pallets to the dense grid layout; and
controlling the at least one robotic device to rearrange the pallets to the dense grid layout based on the amount of time to rearrange the pallets to the dense grid layout being less than a threshold amount of time.

16. The non-transitory computer-readable medium of claim 15, wherein determining the likelihood of demand is further based on a history of pallet relocation within the warehouse.

17. The non-transitory computer-readable medium of claim 15, the operations further comprising:
receiving real-time item information including real-time locations of the pallets positioned in the warehouse and real-time inventory of items arranged on the pallets, wherein the real-time inventory of the items includes a content of each pallet,
wherein determining the dense grid layout is further based on the real-time item information.

18. The non-transitory computer-readable medium of claim 15, the operations further comprising:
receiving real-time robotics information relating to locations of the at least one robotic device and tasks for performance by the at least one robotic device,
wherein determining the amount of time for the at least one robotic device to rearrange the pallets to the dense grid layout is based on the real-time robotics information.

19. A system comprising:
at least one robotic device;
at least one processor; and
data storage comprising instructions executable by the at least one processor to cause the system to perform operations comprising:
determining a likelihood of demand for future access to pallets positioned in a warehouse, wherein determining the likelihood of demand is based on an expectation of items to be received at the warehouse at a future time, and an expectation of items to be shipped out of the warehouse at a future time;
based on the likelihood of demand, determining a dense grid layout to which to arrange the pallets, wherein distances of the pallets from a center of the dense grid layout are related to the likelihood of demand;

determining an amount of time for the at least one robotic device to rearrange the pallets to the dense grid layout; and controlling the at least one robotic device to rearrange the pallets to the dense grid layout based on the amount of time to rearrange the pallets to the dense grid layout being less than a threshold amount of time.

20. The system of claim 19, the operations further comprising:

receiving real-time robotics information relating to locations of the at least one robotic device and tasks for performance by the at least one robotic device, wherein determining the amount of time for the at least one robotic device to rearrange the pallets to the dense grid layout is based on the real-time robotics information.

* * * * *